United States Patent
Yang

(10) Patent No.: US 11,809,314 B2
(45) Date of Patent: Nov. 7, 2023

(54) METHOD AND APPARATUS FOR PERFORMING ACCESS CONTROL OF MEMORY DEVICE WITH AID OF MULTI-STAGE GARBAGE COLLECTION MANAGEMENT

(71) Applicant: Silicon Motion, Inc., Hsinchu County (TW)

(72) Inventor: Tsung-Chieh Yang, Hsinchu (TW)

(73) Assignee: Silicon Motion, Inc., Hsinchu County (TW)

( * ) Notice: Subject to any disclaimer, the term of this patent is extended or adjusted under 35 U.S.C. 154(b) by 179 days.

(21) Appl. No.: 17/531,780

(22) Filed: Nov. 21, 2021

(65) Prior Publication Data

US 2023/0161698 A1    May 25, 2023

(51) Int. Cl.
*G06F 12/00* (2006.01)
*G06F 12/02* (2006.01)
*G06F 3/06* (2006.01)

(52) U.S. Cl.
CPC ........ *G06F 12/0269* (2013.01); *G06F 3/0604* (2013.01); *G06F 3/0659* (2013.01); *G06F 3/0679* (2013.01); *G06F 2212/7205* (2013.01)

(58) Field of Classification Search
CPC .. G06F 12/0269; G06F 3/0604; G06F 3/0659; G06F 3/0679; G06F 2212/7205; G06F 2212/1032; G06F 2212/7203; G06F 2212/7209; G06F 12/0246
See application file for complete search history.

(56) References Cited

U.S. PATENT DOCUMENTS

| 10,061,511 | B2 | 8/2018 | Potash |
| 10,175,892 | B1 | 1/2019 | Kim |
| 11,630,764 | B2* | 4/2023 | Jang ............... G06F 12/0246 711/154 |
| 2008/0082728 | A1* | 4/2008 | Traister ............ G06F 12/0246 711/170 |
| 2017/0168930 | A1* | 6/2017 | Choi ................. G06F 3/0679 |

(Continued)

FOREIGN PATENT DOCUMENTS

| CN | 113227959 A | 8/2021 |
| TW | 202036300 A | 10/2020 |

(Continued)

*Primary Examiner* — Shawn X Gu
*Assistant Examiner* — Mohammad S Hasan
(74) *Attorney, Agent, or Firm* — Winston Hsu

(57) ABSTRACT

A method and apparatus for performing access control of a memory device with aid of multi-stage garbage collection (GC) management are provided. The method includes: during a first GC stage, sending a first simple read command to the NV memory in order to try reading first valid data from a first source block, sending the first valid data into an internal buffer of the NV memory, for being programed into a first destination block, sending a second simple read command to the NV memory in order to try reading second valid data from the first source block, and in response to reading the second valid data from the first source block being unsuccessful, preventing retrying reading the second valid data from the first source block; completing at least one host-triggered operation; and during a second GC stage, retrying reading the second valid data from the first source block.

20 Claims, 8 Drawing Sheets

(56) References Cited

U.S. PATENT DOCUMENTS

| | | | | |
|---|---|---|---|---|
| 2018/0336129 A1* | 11/2018 | Hutchison | ........... | G06F 12/0246 |
| 2019/0251039 A1* | 8/2019 | Modi | ...................... | G06F 3/061 |
| 2020/0012598 A1* | 1/2020 | Feng | ....................... | G06F 3/064 |
| 2020/0034290 A1* | 1/2020 | Yasuda | ............... | G06F 12/0253 |
| 2021/0232499 A1* | 7/2021 | Yong | ................... | G06F 12/0882 |

FOREIGN PATENT DOCUMENTS

| | | |
|---|---|---|
| TW | 202101221 A | 1/2021 |
| WO | 2005/066970 A2 | 7/2005 |

* cited by examiner

FIG. 6

METHOD AND APPARATUS FOR PERFORMING ACCESS CONTROL OF MEMORY DEVICE WITH AID OF MULTI-STAGE GARBAGE COLLECTION MANAGEMENT

BACKGROUND OF THE INVENTION

1. Field of the Invention

The present invention is related to memory control, and more particularly, to a method for performing access control of a memory device with aid of multi-stage garbage collection (GC) management, and associated apparatus such as the memory device, a memory controller thereof, etc.

2. Description of the Prior Art

Developments in memory technology have enabled the wide application of various portable or non-portable memory devices, such as memory cards respectively conforming to the SD/MMC, CF, MS and XD specifications, and embedded memory devices respectively conforming to the UFS and eMMC specifications. Improving access control of these memory devices remains an issue to be solved in the art.

NAND flash memories may comprise single level cell (SLC) and multiple level cell (MLC) flash memories. In an SLC flash memory, each transistor used as a memory cell may store either of two electrical charge values respectively corresponding to logic values 0 and 1. In comparison, the storage ability of each transistor used as a memory cell in an MLC flash memory may be fully utilized. The transistor in the MLC flash memory can be driven by a voltage higher than that in the SLC flash memory, and different voltage levels can be utilized to record information of at least two bits (e.g. 00, 01, 11, or 10). In theory, the recording density of the MLC flash memory may reach at least twice the recording density of the SLC flash memory, and is therefore preferred by manufacturers of NAND flash memories.

The lower cost and larger capacity of the MLC flash memory means it is more likely to be applied in memory devices than an SLC flash memory. The MLC flash memory does have instability issues, however. To ensure that access control of the flash memory in the memory device meets required specifications, a controller of the flash memory may be equipped with some management mechanisms for properly managing data access.

Even memory devices with the above management mechanisms may have certain deficiencies, however. For example, within the memory device that comprises the flash memory mentioned above, the aforementioned controller may be designed to have limited hardware resources in order to save the overall cost of the memory device, and therefore a data buffer of the controller may be very small. During a garbage collection (GC) procedure, the controller may need to read some data pages from one or more SLC blocks in the flash memory and write the data pages into a quadruple level cell (QLC) block in the flash memory, where the controller may be forced to buffer only one data page per time due to the limited hardware resources. For an abnormal read case that the controller cannot get a correctable result from hard-decoding when reading a certain data page, as the hard-decoding cannot overcome the error, the controller may need to trigger soft-decoding. As a result, the flash memory may reuse an internal buffer thereof, and more particularly, damage data previously received from the controller, which may cause a data error problem. One or more other solutions may be proposed to prevent the data error problem, but additional problems such as some side effects may be introduced.

Thus, there is a need for a novel method and associated architecture to solve the problems of the related art without introducing any side effect or in a way that is less likely to introduce side effects.

SUMMARY OF THE INVENTION

An objective of the present invention is to provide a method for performing access control of a memory device with aid of multi-stage garbage collection (GC) management, and to provide an associated apparatus such as the memory device, a controller thereof, etc., in order to solve the problems mentioned above.

At least one embodiment of the present invention provides a method for performing access control of a memory device with aid of multi-stage garbage collection (GC) management, wherein the method is applied to a controller of the memory device. The memory device may comprise the controller and a non-volatile (NV) memory, the NV memory may comprise at least one NV memory element (e.g. one or more NV memory elements), and the aforementioned at least one NV memory element may comprise a plurality of blocks. The method may comprise: during a first GC stage, sending a first simple read command to the NV memory in order to try reading first valid data from a first source block among the plurality of blocks; during the first GC stage, in response to reading the first valid data from the first source block being successful, sending the first valid data into an internal buffer of the NV memory, for being programed into a first destination block among the plurality of blocks; during the first GC stage, sending a second simple read command to the NV memory in order to try reading second valid data from the first source block; during the first GC stage, in response to reading the second valid data from the first source block being unsuccessful, preventing retrying reading the second valid data from the first source block; in a time period between an end time point of the first GC stage and a beginning time point of a second GC stage after the first GC stage, completing at least one host-triggered operation, wherein the controller performs the at least one host-triggered operation in response to at least one host command among a plurality of host commands from a host device; and during the second GC stage, retrying reading the second valid data from the first source block.

In addition to the method mentioned above, the present invention also provides a controller of a memory device, wherein the memory device comprises the controller and an NV memory. The NV memory may comprise at least one NV memory element (e.g. one or more NV memory elements), and the aforementioned at least one NV memory element may comprise a plurality of blocks. In addition, the controller comprises a processing circuit, wherein the processing circuit is configured to control the controller according to a plurality of host commands from a host device, to allow the host device to access the NV memory through the controller. For example, during a first GC stage, the controller sends a first simple read command to the NV memory in order to try reading first valid data from a first source block among the plurality of blocks; during the first GC stage, in response to reading the first valid data from the first source block being successful, the controller sends the first valid data into an internal buffer of the NV memory, for being programed into a first destination block among the plurality of blocks; during the first GC stage, the controller sends a second simple read command to the NV memory in order to try reading second valid data from the first source block; during the first GC stage, in response to reading the second valid data from the first source block being unsuccessful, the controller prevents retrying reading the second valid data from the first source block; in a time period between an end time point of the first GC stage and a beginning time point of a second GC stage after the first GC stage, the controller completes at least one host-triggered operation, wherein the controller performs the at least one host-triggered operation in response to at least one host command among the plurality of host commands from the host device; and during the second GC stage, the controller retries reading the second valid data from the first source block.

In addition to the method mentioned above, the present invention also provides a memory device such as the memory device comprising the controller mentioned above, wherein the memory device comprises: the NV memory, configured to store information; and the controller, coupled to the NV memory, configured to control operations of the memory device.

At least one embodiment of the present invention provides a method for performing access control of a memory device with aid of multi-stage garbage collection (GC) management, wherein the method is applied to a controller of the memory device. The memory device may comprise the controller and a non-volatile (NV) memory, the NV memory may comprise at least one NV memory element (e.g. one or more NV memory elements), and the aforementioned at least one NV memory element may comprise a plurality of blocks. The method may comprise: in a time period before a beginning time point of a first GC stage, in response to multiple first host commands among a plurality of host commands from a host device, sending multiple first read commands to the NV memory in order to try reading first data from at least one page of a first block among the plurality of blocks multiple times, respectively, wherein for each time of the multiple times except a last time of the multiple times, reading the first data from the at least one page of the first block is successful, and for the last time of the multiple times, reading the first data from the at least one page of the first block is unsuccessful; in the time period before the beginning time point of the first GC stage, in response to reading the first data from the at least one page of the first block being unsuccessful, sending at least one second read command to the NV memory in order to retry reading the first data from the at least one page of the first block; during the first GC stage, reading first valid data from at least one first page of a first source block and sending the first valid data into an internal buffer of the NV memory, for being programed into a first destination block among the plurality of blocks, wherein the first block is used as the first source block, and the at least one first page of the first source block is different from the at least one page of the first block; during the first GC stage, trying reading the first data from the first source block, and in response to reading the first data from the first source block being unsuccessful, preventing retrying reading the first data from the first source block, for waiting for further processing during a second GC stage after the first GC stage; and in a time period between an end time point of the first GC stage and a beginning time point of the second GC stage, in response to at least one other host command among the plurality of host commands, reading the first valid data from the destination block and trying reading the first data from the first source block.

In addition to the method mentioned above, the present invention also provides a controller of a memory device, wherein the memory device comprises the controller and an NV memory. The NV memory may comprise at least one NV memory element (e.g. one or more NV memory elements), and the aforementioned at least one NV memory element may comprise a plurality of blocks. In addition, the controller comprises a processing circuit, wherein the processing circuit is configured to control the controller according to a plurality of host commands from a host device, to allow the host device to access the NV memory through the controller. For example, in a time period before a beginning time point of a first GC stage, in response to multiple first host commands among the plurality of host commands, the controller sends multiple first read commands to the NV memory in order to try reading first data from at least one page of a first block among the plurality of blocks multiple times, respectively, wherein for each time of the multiple times except a last time of the multiple times, reading the first data from the at least one page of the first block is successful, and for the last time of the multiple times, reading the first data from the at least one page of the first block is unsuccessful; in the time period before the beginning time point of the first GC stage, in response to reading the first data from the at least one page of the first block being unsuccessful, the controller sends at least one second read command to the NV memory in order to retry reading the first data from the at least one page of the first block; during the first GC stage, the controller reads first valid data from at least one first page of a first source block and sends the first valid data into an internal buffer of the NV memory, for being programed into a first destination block among the plurality of blocks, wherein the first block is used as the first source block, and the at least one first page of the first source block is different from the at least one page of the first block; during the first GC stage, the controller tries reading the first data from the first source block, and in response to reading the first data from the first source block being unsuccessful, the controller prevents retrying reading the first data from the first source block, for waiting for further processing during a second GC stage after the first GC stage; and in a time period between an end time point of the first GC stage and a beginning time point of the second GC stage, in response to at least one other host command among the plurality of host commands, the controller reads the first valid data from the destination block and tries reading the first data from the first source block.

In addition to the method mentioned above, the present invention also provides a memory device such as the memory device comprising the controller mentioned above, wherein the memory device comprises: the NV memory, configured to store information; and the controller, coupled to the NV memory, configured to control operations of the memory device.

The method and the associated apparatus provided by the present invention can ensure that the memory device can properly operate under various situations, where examples of the apparatus mentioned above comprise: the controller, the memory device, etc. In addition, the method and the associated apparatus provided by the present invention can solve the problems of the related art without introducing any side effect or in a way that is less likely to introduce side effects. Additionally, with aid of the multi-stage GC management, the method and the associated apparatus provided by the present invention can ensure real-time response from the memory device to the host device, and therefore can improve the overall performance.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

FIG. 6 illustrates some NAR information entries recorded based on the source block NAR control scheme shown in FIG. 5 according to an embodiment of the present invention.

DETAILED DESCRIPTION

Figure 1:
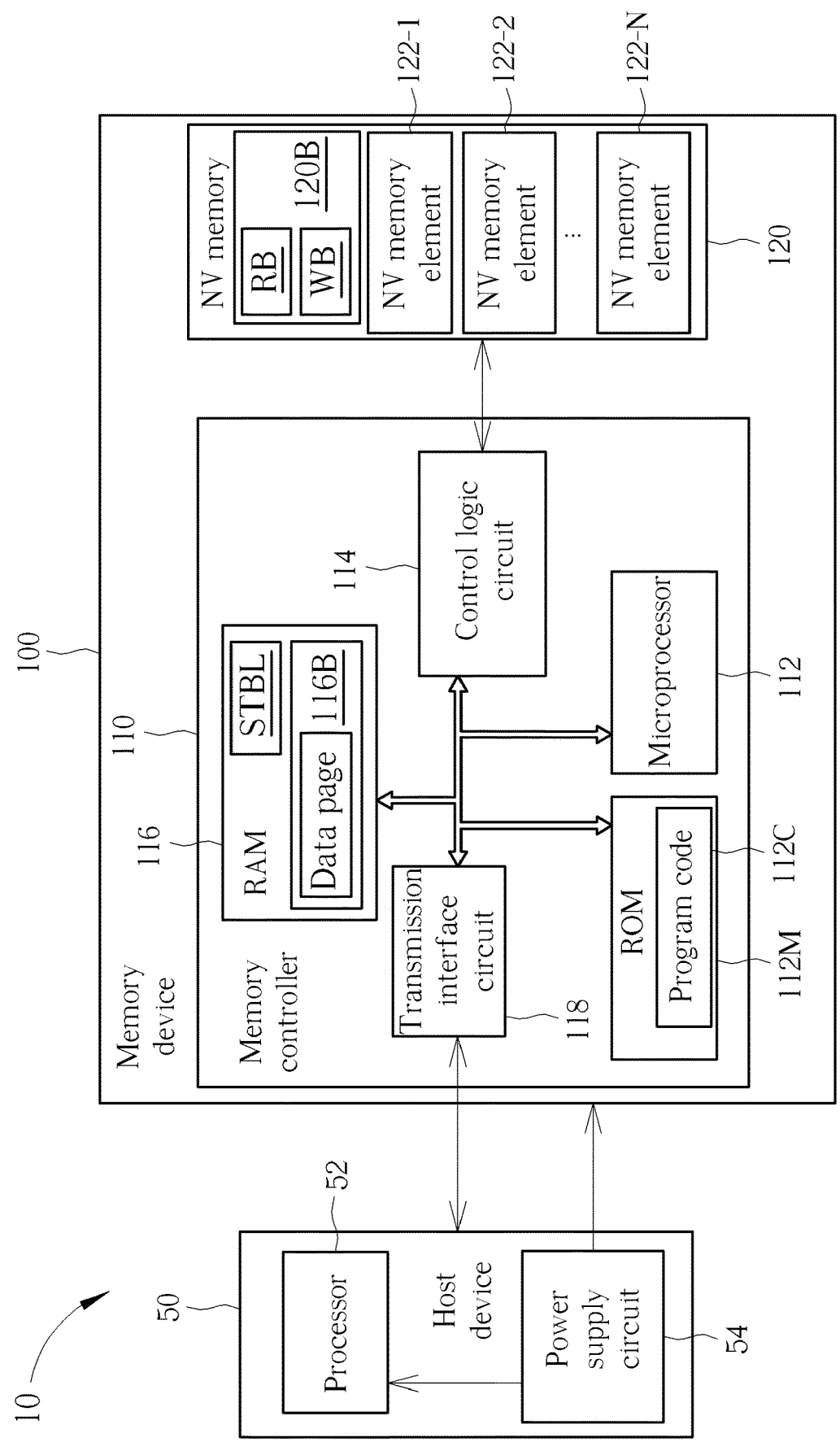
FIG. 1 is a diagram of an electronic device according to an embodiment of the present invention.

FIG. 1 is a diagram of an electronic device 10 according to an embodiment of the present invention, where the electronic device 10 may comprise a host device 50 and a memory device 100. The host device 50 may comprise at least one processor (e.g. one or more processors), which may be collectively referred to as a processor 52, and the host device 50 may further comprise a power supply circuit 54, coupled to the processor 52. The processor 52 is arranged to control operations of the host device 50, and the power supply circuit 54 is arranged to provide power to the processor 52 and the memory device 100, and output one or more driving voltages to the memory device 100. The memory device 100 can be arranged to provide the host device 50 with storage space, and the one or more driving voltages can be obtained from the host device 50 to be used as the power source of the memory device 100. Examples of the host device 50 may comprise (but are not limited to) multifunctional mobile phone, wearable device, tablet, and personal computer such as desktop computer and laptop computer. Examples of the memory device 100 may comprise (but are not limited to) portable memory devices (e.g. memory cards conforming to SD/MMC, CF, MS, or XD specification), solid state drives (SSD), and various embedded memory devices respectively conforming to UFS and EMMC specification. According to the embodiment, the memory device 100 may comprise a controller such as a memory controller 110, and may further comprise a non-volatile (NV) memory 120, where the controller is arranged to control operations of the memory device 100 and access the NV memory 120, and the NV memory 120 is arranged to store information. The NV memory 120 may comprise an internal buffer 120B and at least one NV memory element (e.g. one or more NV memory elements) such as a plurality of NV memory elements 122-1, 122-2, . . . and 122-N, where the symbol "N" can represent a positive integer greater than one. For example, the NV memory 120 may be a flash memory, and the plurality of NV memory elements 122-1, 122-2, . . . and 122-N may be a plurality of flash memory chips or a plurality of flash memory dies, but the invention is not limited thereto. Additionally, the internal buffer 120B may comprise a read buffer RB and a write buffer WB. The read buffer RB may be arranged to buffer (or temporarily store) one or more data pages of one or more read operations, such as one or more data pages read from one or more of the plurality of NV memory elements 122-1, 122-2, . . . and 122-N, for being read by the memory controller 110 during the one or more read operations, and the write buffer WB may be arranged to buffer one or more data pages of one or more write operations, such as one or more data pages sent from the memory controller 110, for being programed into one or more of the plurality of NV memory elements 122-1, 122-2, . . . and 122-N during the one or more write operations.

As shown in FIG. 1, the memory controller 110 may comprise a processing circuit such as a microprocessor 112, a storage unit such as a read-only memory (ROM) 112M, a control logic circuit 114, a random access memory (RAM) 116, and a transmission interface circuit 118, where the above elements can be coupled to each other through a bus. The RAM 116 is implemented by a static random access memory (SRAM), but the invention is not limited thereto. The RAM 116 can be arranged to provide the memory controller 110 with internal storage space. For example, the RAM 116 can be used as a buffer memory to buffer data. More particularly, the RAM 116 may comprise a buffer region that is used as a data buffer 116B, and the data buffer 116B may have a buffer size corresponding to at least one data page (e.g. one or more data pages). The memory controller 110 may be designed to have limited hardware resources in order to save the overall cost of the memory device 100, and therefore the data buffer 116B may be very small, for example, may have the buffer size corresponding to a single data page for buffering only one data page, but the invention is not limited thereto. In addition, the ROM 112M of the embodiment is arranged to store a program code 112C, and the microprocessor 112 is arranged to execute the program code 112C to control access to the NV memory 120. Please note that, in some examples, the program code 112C can be stored in the RAM 116 or any form of memory. In addition, a data protection circuit (not shown) in the control logic circuit 114 can protect data and/or perform error correction, and the transmission interface circuit 118 can conform to a specific communication specification such as Serial Advanced Technology Attachment (SATA) specification, Universal Serial Bus (USB) specification, Peripheral Component Interconnect Express (PCIe) specification, embedded Multi-Media Card (eMMC) specification, or Universal Flash Storage (UFS) specification), and can perform communication according to the specific communication specification.

In the embodiment, the host device 50 can access the memory device 100 by sending host commands and corresponding logical addresses to the memory controller 110. The memory controller 110 receives the host commands and the logical addresses, and translates the host commands into memory operation commands (which may be simply called operation commands), and then controls the NV memory with the operation commands to perform reading, writing/programing, etc. on memory units (e.g. data pages) with physical addresses in the NV memory 120, where the physical addresses can be associated with the logical addresses. When the memory controller 110 performs an erase operation on any NV memory element 122-$n$ among the plurality of NV memory elements 122-1, 122-2, . . . and 122-N (the symbol "$n$" can represent any integer in the interval [1, N]), at least one of multiple blocks of the NV memory device 122-$n$ will be erased, where each block in the multiple blocks can comprise multiple pages (e.g. data pages), and an access operation (e.g. reading or writing) can be performed on one or more pages.

According to some embodiments, the processing circuit such as the microprocessor 112 can control the memory controller 110 according to a plurality of host commands from the host device 50, to allow the host device 50 to access the NV memory 120 through the memory controller 110. The memory controller 110 can store data into the NV memory 120 for the host device 50, read the stored data in response to a host command from the host device 50 (e.g. one of the plurality of host commands), and provide the host device 50 with the data read from the NV memory 120. In the NV memory 120 such as the flash memory, the aforementioned at least one NV memory element (e.g. the plurality of NV memory elements 122-1, 122-2, . . . and 122-N) may comprise a plurality of blocks such as a first set of physical blocks in the NV memory element 122-1, a second set of physical blocks in the NV memory element 122-2, . . . and an $N^{th}$ set of physical blocks in the NV memory element 122-N. The memory controller 110 can be designed to properly manage the plurality of blocks such as these sets of physical blocks.

More particularly, the plurality of blocks such as these sets of physical blocks may comprise a plurality of data blocks (e.g. a plurality of valid blocks storing valid data) and a plurality of spare blocks. The memory controller 110 can perform block management on the plurality of data blocks and the plurality of spare blocks. For example, the memory controller 110 can select a spare block from the plurality of spare blocks and change this spare block to be a new member of the plurality of data blocks, such as a new data block for performing data writing. In response to a write request for writing data at a certain logical address, the memory controller 110 can write the data at a first location within the NV memory 120, such as a physical address associated with this logical address. In response to another write request for writing data at the same logical address, the memory controller 110 can write the data at a second location within the NV memory 120, such as another physical address associated with this logical address, and determine that the data at the first location within the NV memory 120 becomes invalid data. In addition, the memory controller 110 can trigger a garbage collection (GC) procedure to discard invalid data in one or more data blocks among the plurality of data blocks and make valid data in the one or more data blocks be stored together somewhere else, and more particularly, select one or more spare blocks from the plurality of spare blocks and change the one or more spare blocks to be one or more new members of the plurality of data blocks, such as one or more new data blocks, copy the valid data from the one or more data blocks into the one or more new data blocks, and change the one or more data blocks to be one or more new members of the plurality of spare blocks, such as one or more new spare blocks, in order to prepare more storage space by erasing the one or more new spare blocks, for further storing new data.

The memory controller 110 can record, maintain, and/or update block management information regarding the block management in at least one table such as at least one temporary table in the RAM 116 and at least one non-temporary table in the NV memory 120, where the latter can also be referred to as intra-NV-memory (intra-NVM) table since it is in the NV memory 120. The at least one temporary table may comprise a temporary version of at least a portion (e.g. a part or all) of the at least one non-temporary table. For example, the at least one non-temporary table may comprise at least one logical-to-physical (L2P) address mapping table (e.g. one or more L2P address mapping tables), for recording mapping relationships between logical addresses (e.g. logical block addresses (LBAs) indicating multiple logical blocks, and logical page addresses (LPAs) indicating multiple logical pages within any of the multiple logical blocks) and physical addresses (e.g. physical block addresses (PBAs) indicating multiple physical blocks, and physical page addresses (PPAs) indicating multiple physical pages within any of the multiple physical blocks), and the at least one temporary table may comprise a temporary version of at least one sub-table (e.g. one or more sub-tables) of the at least one L2P address mapping table, where the memory controller 110 (e.g. the microprocessor 112) can perform bi-directional address translation between the host-side storage space (e.g. the logical addresses) of the host device 50 and the device-side storage space (e.g. the physical addresses) of the NV memory 120 within the memory device 100, in order to access data for the host device 50. For example, the at least one non-temporary table may further comprise a spare block management table for managing the plurality of spare blocks, and the at least one temporary table may comprise a temporary version of the spare block management table. In addition, the memory controller 110 can back up the at least one temporary table to the at least one non-temporary table in the NV memory 120 (e.g. one or more NV memory elements in the plurality of NV memory elements 122-1, 122-2, . . . and 122-N), and the memory controller 110 may load at least a portion (e.g. a part or all) of the at least one non-temporary table into the RAM 116 to become the at least one temporary table for quick reference. For example, the at least one temporary table may further comprise at least one GC management table regarding multi-stage GC management, such as at least one source block needing-advanced-read (NAR) table (e.g. one or more source block NAR tables), collectively referred to as the source block NAR table STBL, and the memory controller 110 can back up the source block NAR table STBL into the NV memory 120 (e.g. the one or more NV memory elements in the plurality of NV memory elements 122-1, 122-2, . . . and 122-N) to be a portion of the at least one non-temporary table in the NV memory 120.

Figure 2A:
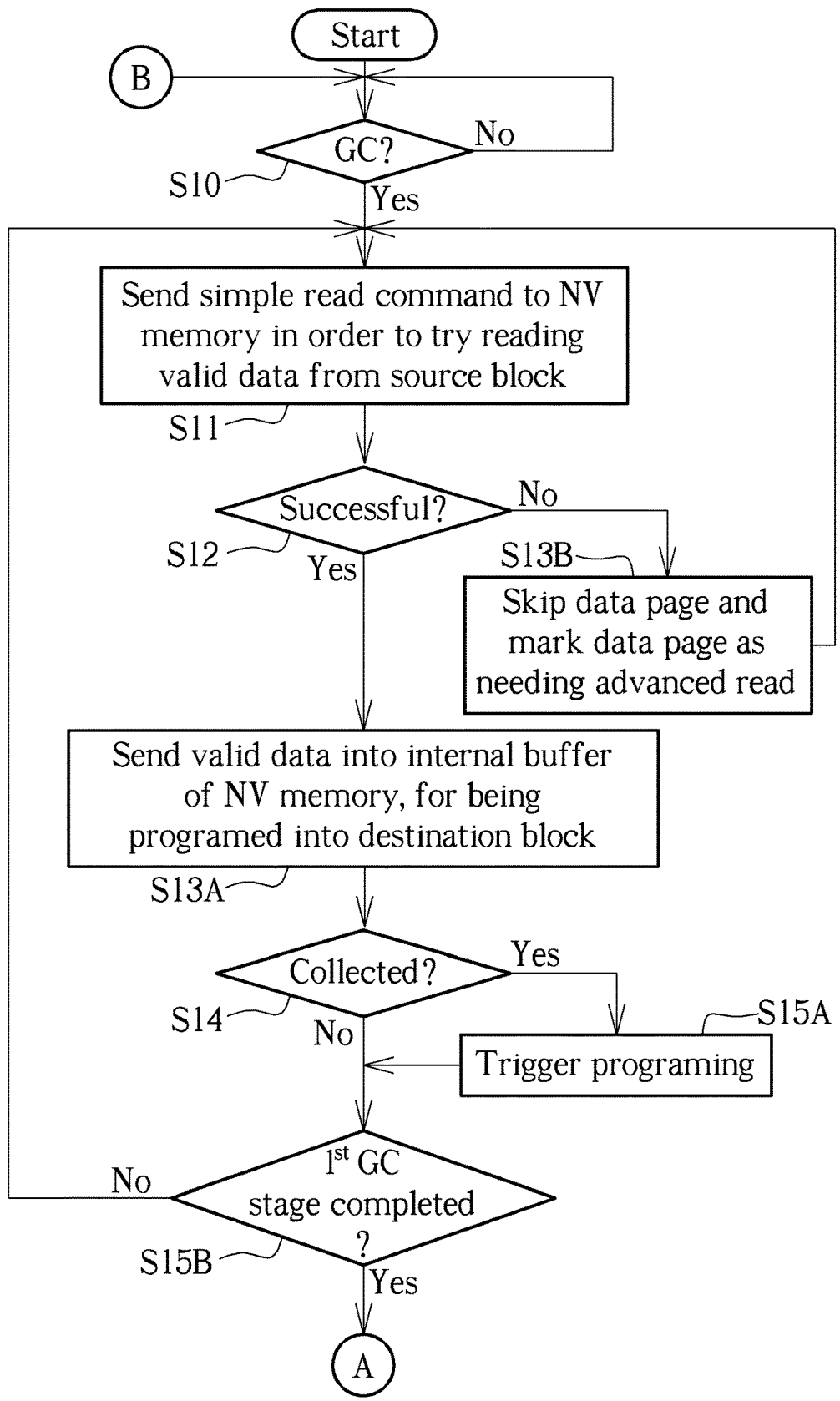
FIG. 2A illustrates a first portion of a flowchart of a method for performing access control of a memory device such as that shown in FIG. 1 with aid of multi-stage garbage collection (GC) management according to an embodiment of the present invention.
Figure 2B:
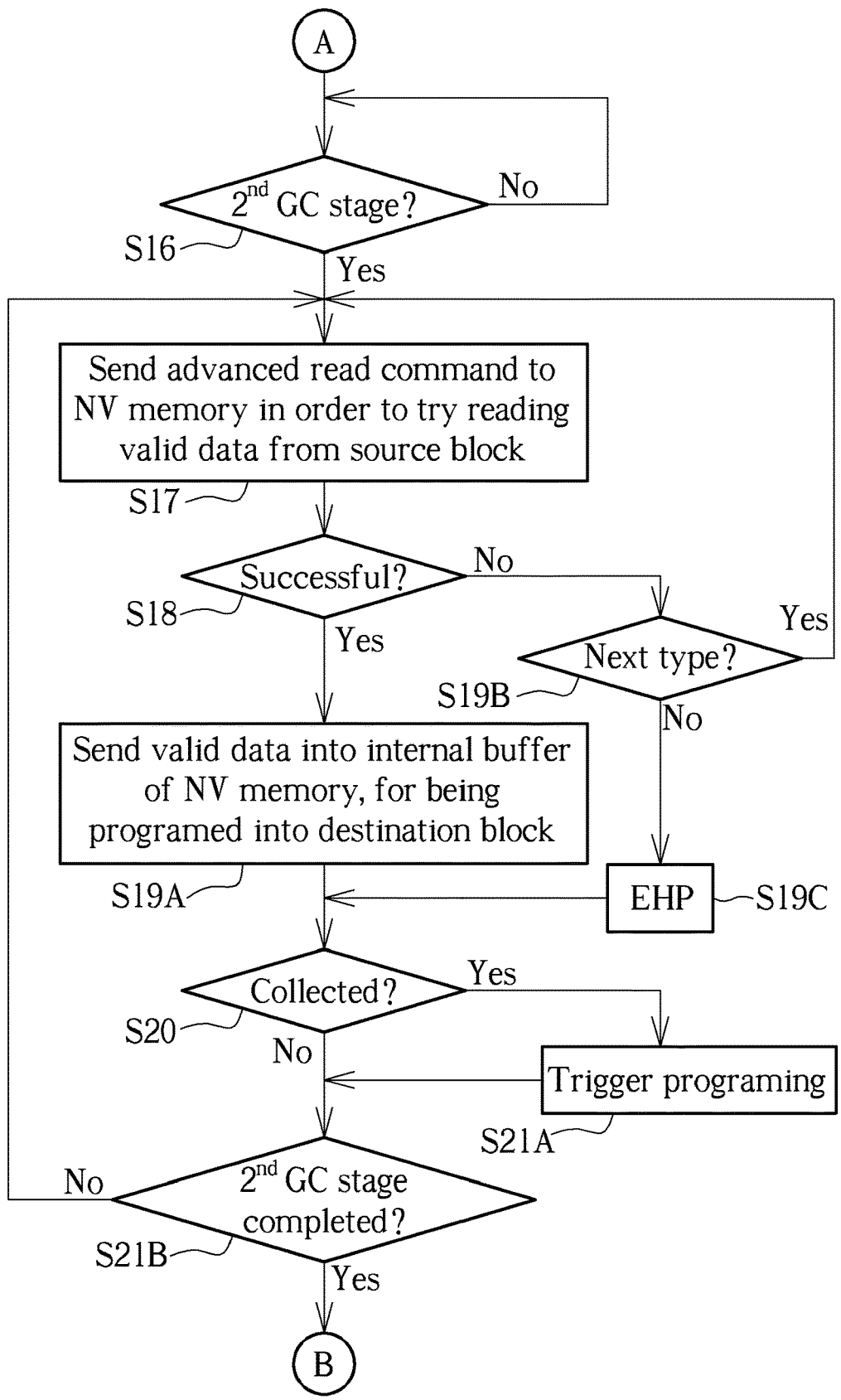
FIG. 2B illustrates a second portion of the flowchart of the method for performing the access control of the memory device with aid of the multi-stage GC management.

FIG. 2A and FIG. 2B respectively illustrate a first portion and a second portion of a flowchart of a method for performing access control of a memory device such as that shown in FIG. 1 with aid of the multi-stage GC management according to an embodiment of the present invention, where the nodes A and B may indicate the connections between respective partial working flows of FIG. 2A and FIG. 2B. The method can be applied to the architecture shown in FIG. 1 (e.g. the electronic device 10, the memory device 100, the memory controller 110, and the microprocessor 112), and can be executed by the memory controller 110 (e.g. the microprocessor 112) of the memory device 100. For better comprehension, a first GC stage (labeled "1st GC stage" in FIG. 2A for brevity) of the GC procedure mentioned above may comprise most operations of the first portion shown in FIG. 2A, such as the operations of Steps S11, S12, S13A, S13B, S14, S15A and S15B, and a second GC stage (labeled "2nd GC stage" in FIG. 2B for brevity) of the GC procedure may comprise most operations of the second portion shown in FIG. 2B, such as the operations of Steps S17, S18, S19A, S19B, S20A and S20B.

In Step S10, the memory controller 110 (e.g. the microprocessor 112) can determine whether to trigger the GC procedure (labeled "GC" for brevity). If Yes, Step S11 is entered; if No, Step S10 is entered.

For example, the memory controller 110 (e.g. the microprocessor 112) can determine whether to trigger the GC procedure according to whether a spare block count of the plurality of spare blocks is less than a predetermined spare block count threshold, and more particularly, selectively perform one of the following operations:
(1) triggering the GC procedure if the spare block count is less than the predetermined spare block count threshold; and
(2) preventing triggering the GC procedure if the spare block count is greater than or equal to the predetermined spare block count threshold; but the invention is not limited thereto.

In Step S11, the memory controller 110 (e.g. the microprocessor 112) can send a simple read command to the NV memory 120 in order to try reading valid data from a source block (e.g. any data block among the one or more data blocks), and more particularly, try reading the valid data from a certain physical page within the source block. As the physical page can be arranged to store data, the physical page can be regarded as a data page.

In Step S12, the memory controller 110 (e.g. the microprocessor 112) can determine whether reading the valid data from the source block (e.g. the physical page such as the data page) is successful. If Yes, Step S13A is entered; if No, Step S13B is entered.

In Step S13A, in response to reading the valid data from the source block (e.g. the physical page such as the data page) being successful, the memory controller 110 (e.g. the microprocessor 112) can send the valid data into the internal buffer 120B (e.g. the write buffer WB) of the NV memory 120, for being programed into a destination block (e.g. any new data block among the one or more new data blocks).

In Step S13B, in response to reading the valid data from the source block (e.g. the physical page such as the data page) being unsuccessful, the memory controller 110 (e.g. the microprocessor 112) can skip this data page and mark this data page as needing advanced read, for example, by using a need advanced read flag Need_AER, for indicating that this data page is arranged to be further processed with an advance read operation in the next GC stage such as the second (2nd) GC stage.

For example, within the memory device 100, the memory controller 110 may be designed to have limited hardware resources in order to save the overall cost of the memory device 100, and therefore the data buffer 116B of the memory controller 110 may be very small. During the GC procedure, the memory controller 110 may need to read some data pages from one or more single level cell (SLC) blocks in the NV memory 120 and write the data pages into a higher level cell block such as a triple level cell (TLC) block, a quadruple level cell (QLC) block, etc. in the NV memory 120. When the data buffer 116B is very small, the memory controller 110 may be forced to buffer only one data page per time, and more particularly, read this data page from the SLC block for being buffered in the data buffer 116B, and send this data page into the internal buffer 120B of the NV memory 120 for being collected as one of a set of associated data pages to be programed into the higher level cell block such as the TLC block, the QLC block, etc. at the same time. For example, when the higher level cell block represents the TLC block, the set of associated data pages can be three associated data pages. For another example, when the higher level cell block represents the QLC block, the set of associated data pages can be four associated data pages.

For a normal read case that the memory controller 110 can get a correctable result from hard-decoding when reading any data page, after the set of associated data pages have been sent into the internal buffer 120B of the NV memory 120, the memory controller 110 can trigger the NV memory 120 to program the set of associated data pages into the higher level cell block at the same time. For an abnormal read case that the memory controller 110 cannot get a correctable result from hard-decoding when reading a certain data page in the current GC stage such as the first (1st) GC stage, as the hard-decoding cannot overcome the error, the memory controller 110 may skip this data page and mark this data page as needing advanced read, for example, by using the need advanced read flag Need_AER as described above. As the memory controller 110 does not need to immediately trigger soft-decoding, the memory controller 110 can prevent the NV memory 120 from reusing the internal buffer 120B (e.g. the read buffer RB and/or the write buffer WB) thereof, and more particularly, prevent one or more previously collected data pages among the set of associated data pages within the write buffer WB from being overwritten with other information, and therefore prevent the data error problem.

In Step S14, the memory controller 110 (e.g. the microprocessor 112) can determine whether sufficient data pages have been collected from the memory controller 110 (e.g. the data buffer 116B therein) into the NV memory 120 (e.g. the internal buffer 120B therein) for being programed. If Yes, Step S15A is entered; if No, Step S15B is entered.

For example, in a situation where the destination block is a TLC block, the memory controller 110 (e.g. the microprocessor 112) can selectively perform one of the following operations:
(1) when three data pages have been collected into the NV memory 120 (e.g. the internal buffer 120B therein), the memory controller 110 (e.g. the microprocessor 112) can determine that sufficient data pages have been collected, and therefore Step S15A is entered; and
(2) when three data pages have not been collected into the NV memory 120 (e.g. the internal buffer 120B therein), the memory controller 110 (e.g. the microprocessor 112) can determine that sufficient data pages have not been collected, and therefore Step S15B is entered; but the invention is not limited thereto. For another example, in a situation where the destination block is a QLC block, the memory controller 110 (e.g. the microprocessor 112) can selectively perform one of the following operations:
(1) when four data pages have been collected into the NV memory 120 (e.g. the internal buffer 120B therein), the memory controller 110 (e.g. the microprocessor 112) can determine that sufficient data pages have been collected, and therefore Step S15A is entered; and
(2) when four data pages have not been collected into the NV memory 120 (e.g. the internal buffer 120B therein), the memory controller 110 (e.g. the microprocessor 112) can determine that sufficient data pages have not been collected, and therefore Step S15B is entered.

In Step S15A, the memory controller 110 (e.g. the microprocessor 112) can trigger the programing of the data pages collected into the NV memory 120 (e.g. the internal buffer 120B therein), for example, by sending a programing-trigger command to the NV memory 120.

In Step S15B, the memory controller 110 (e.g. the microprocessor 112) can determine whether the first ($1^{st}$) GC stage is completed. If Yes, Step S16 is entered; if No, Step S11 is entered.

As shown in FIG. 2A, the memory controller 110 (e.g. the microprocessor 112) can perform the following operations:
(1) during the first GC stage, when Step S11 is entered at a first time point, the memory controller 110 can send a first simple read command to the NV memory 120 in order to try reading first valid data from the source block;
(2) during the first GC stage, when Steps S12 and S13A are subsequently entered afterward, in response to reading the first valid data from the source block being successful, the memory controller 110 can send the first valid data into the internal buffer 120B of the NV memory 120, for being programed into the destination block;
(3) during the first GC stage, when Step S11 is entered at a second time point (e.g. a time point after the first time point), the memory controller 110 can send a second simple read command to the NV memory 120 in order to try reading second valid data from the source block;
(4) during the first GC stage, when Steps S12 and S13B are subsequently entered afterward, in response to reading the second valid data from the source block being unsuccessful, the memory controller 110 can prevent retrying reading the second valid data from the source block;
(5) during the first GC stage, when Step S11 is entered at a third time point (e.g. a time point after the second time point), in response to reading the second valid data from the source block being unsuccessful, the memory controller 110 can send a third simple read command to the NV memory 120 in order to try reading third valid data from the source block; and
(6) during the first GC stage, when Steps S12 and S13B are subsequently entered afterward, in response to reading the third valid data from the source block being successful, the memory controller 110 can send the third valid data into the internal buffer 120B of the NV memory 120, for being programed into the destination block;
but the invention is not limited thereto. As shown in FIG. 2B, the memory controller 110 (e.g. the microprocessor 112) can further perform the following operations:
(7) in a time period between the end time point of the first GC stage and the beginning time point of the second GC stage after the first GC stage, when Step S16 is re-entered for waiting for a chance to start the second GC stage, the memory controller 110 can complete at least one host-triggered operation (e.g. one or more host-triggered operations), where the memory controller 110 can perform the at least one host-triggered operation in response to at least one host command among the plurality of host commands, and more particularly, perform data reading in response to a read request from the host device 50 and/or perform data writing in response to a write request from the host device 50; and
(8) during the second GC stage, the memory controller 110 can retry reading the second valid data from the source block.

For example, multiple simple read commands may comprise the first simple read command, the second simple read command, the third simple read command, etc. Regarding preventing retrying reading the second valid data from the source block, the memory controller 110 can prevent sending any advanced read command to the NV memory 120, where the any advanced read command and any simple read command among the multiple simple read commands belong to different types of read commands, respectively. More particularly, the any advanced read command may represent any read command among multiple types of read commands causing more read processing time of the NV memory 120 than that of the any simple read command. Examples of the multiple types of read commands may include, but are not limited to: a corrective read command, a digital signal processing (DSP)-on read command, a soft-read command, and a Redundant Array of Independent Disks (RAID)-recovery read command.

In Step S16, the memory controller 110 (e.g. the microprocessor 112) can determine whether to start the second ($2^{nd}$) GC stage. If Yes, Step S17 is entered; if No, Step S16 is entered.

For example, the memory controller 110 (e.g. the microprocessor 112) can selectively perform one of the following operations:
(1) when the memory controller 110 is still performing the at least one host-triggered operation in response to the at least one host command, the memory controller 110 (e.g. the microprocessor 112) can determine to continue waiting, and more particularly, waiting for a predetermined status such as a non-busy status, an idle status, etc. of the memory device 100 (e.g. the at least one host-triggered operation is completed and no additional host command is received), and therefore Step S16 is entered; and
(2) when the memory controller 110 completes the at least one host-triggered operation in response to the at least one host command, and more particularly, detects the predetermined status such as the non-busy status, the idle status, etc., the memory controller 110 (e.g. the microprocessor 112) can determine to start the second ($2^{nd}$) GC stage, and therefore Step S17 is entered.

In Step S17, regarding retrying reading the valid data (e.g. the second valid data) that has not been successfully read in the first GC stage, the memory controller 110 (e.g. the microprocessor 112) can send an advanced read command to the NV memory 120 in order to try reading the valid data from the source block (e.g. the source block mentioned in Step S11), and more particularly, try reading the valid data (e.g. the second valid data) from a target page of the second GC stage, where the target page may represent any previously accessed data page among at least one previously accessed data page (e.g. one or more previously accessed data pages) that has been skipped and marked as needing advanced read in Step S13B during the first GC stage.

In the loop comprising Steps S17, S18 and S19B, the memory controller 110 (e.g. the microprocessor 112) may send at least one advanced read command (e.g. one or more advanced read commands) such as the advanced read command mentioned in Step S17 to the NV memory 120 in order to try reading the valid data (e.g. the second valid data mentioned above) from the source block, where the at least one advanced read command and the any simple read command among the multiple simple read commands belong to different types of read commands, respectively. More particularly, the at least one advanced read command may comprise at least one read command (e.g. one or more read commands) among the multiple types of read commands causing more read processing time of the NV memory 120 than that of the any simple read command. The memory controller 110 (e.g. the microprocessor 112) can use the multiple types of read commands to request the NV memory 120 to enable associated read processing mechanisms, respectively. As the associated read processing mechanisms corresponding to the multiple types of read commands are more complicated than that corresponding to the any simple read command, the multiple types of read commands cause more read processing time of the NV memory 120 than that of the any simple read command.

In Step S18, the memory controller 110 (e.g. the microprocessor 112) can determine whether reading the valid data (e.g. the second valid data) from the source block (e.g. the target page such as the any previously accessed data page) is successful. If Yes, Step S19A is entered; if No, Step S19B is entered.

In Step S19A, in response to reading the valid data (e.g. the second valid data) from the source block (e.g. the target page such as the any previously accessed data page) being successful, the memory controller 110 (e.g. the microprocessor 112) can send the valid data into the internal buffer 120B (e.g. the write buffer WB) of the NV memory 120, for being programed into a certain destination block of the second GC stage. For example, when the destination block of the first GC stage is not full (e.g. there is more storage space for storing additional data pages), the destination block of the second GC stage can be equal to the destination block of the first GC stage. For another example, when the destination block of the first GC stage is full (e.g. there is no more storage space for storing any additional data page), the destination block of the second GC stage can be another destination block (e.g. another new data block among the one or more new data blocks).

In Step S19B, in response to reading the valid data (e.g. the second valid data) from the source block (e.g. the target page such as the any previously accessed data page) being unsuccessful, the memory controller 110 (e.g. the microprocessor 112) can determine whether a next type of advanced read command among the multiple types of advanced read commands is available. If Yes, Step S17 is entered to retry reading the valid data (e.g. the second valid data) from the source block (e.g. the target page such as the any previously accessed data page) with the next type of advanced read command; if No, Step S19C is entered.

In Step S19C, the memory controller 110 (e.g. the microprocessor 112) can execute an error handling procedure (labeled "EHP" for brevity). For example, in the error handling procedure, the memory controller 110 (e.g. the microprocessor 112) can send a predetermined type of advanced read command (e.g. the same advanced read command that has just be used in Step S17) to retry reading the valid data from the same target page (e.g. the same previously accessed data page that has just been accessed in Step S17) one or more times, for example, until the number of times of the retry operation of the error handling procedure reaches a predetermined error handling retry count threshold. For a better case that this retry operation is successful, the memory controller 110 (e.g. the microprocessor 112) can send the valid data into the internal buffer 120B (e.g. the write buffer WB) of the NV memory 120, for being programed into the destination block of the second GC stage, where this sending operation is similar to that of Step S19A. For the worst case that this retry operation is unsuccessful, the memory controller 110 (e.g. the microprocessor 112) can record this unsuccessful processing result into a log file for further processing.

In Step S20, the memory controller 110 (e.g. the microprocessor 112) can determine whether sufficient data pages have been collected from the memory controller 110 (e.g. the data buffer 116B therein) into the NV memory 120 (e.g. the internal buffer 120B therein) for being programed. If Yes, Step S21A is entered; if No, Step S21B is entered.

For example, in a situation where the destination block is a TLC block, the memory controller 110 (e.g. the microprocessor 112) can selectively perform one of the following operations:
(1) when three data pages have been collected into the NV memory 120 (e.g. the internal buffer 120B therein), the memory controller 110 (e.g. the microprocessor 112) can determine that sufficient data pages have been collected, and therefore Step S21A is entered; and
(2) when three data pages have not been collected into the NV memory 120 (e.g. the internal buffer 120B therein), the memory controller 110 (e.g. the microprocessor 112) can determine that sufficient data pages have not been collected, and therefore Step S21B is entered; but the invention is not limited thereto. For another example, in a situation where the destination block is a QLC block, the memory controller 110 (e.g. the microprocessor 112) can selectively perform one of the following operations:
(1) when four data pages have been collected into the NV memory 120 (e.g. the internal buffer 120B therein), the memory controller 110 (e.g. the microprocessor 112) can determine that sufficient data pages have been collected, and therefore Step S21A is entered; and
(2) when four data pages have not been collected into the NV memory 120 (e.g. the internal buffer 120B therein), the memory controller 110 (e.g. the microprocessor 112) can determine that sufficient data pages have not been collected, and therefore Step S21B is entered.

In Step S21A, the memory controller 110 (e.g. the microprocessor 112) can trigger the programing of the data pages collected into the NV memory 120 (e.g. the internal buffer 120B therein), for example, by sending the programing-trigger command to the NV memory 120.

In Step S21B, the memory controller 110 (e.g. the microprocessor 112) can determine whether the second ($2^{nd}$) GC stage is completed. If Yes, Step S10 is entered; if No, Step S17 is entered.

For better comprehension, the method may be illustrated with the working flow shown in FIG. 2A and FIG. 2B, but the present invention is not limited thereto. According to some embodiments, one or more steps may be added, deleted, or changed in the working flow shown in FIG. 2A and FIG. 2B.

According to some embodiments, operations of the first GC stage can be performed in background while the memory controller 110 is writing data from the host device 50 into the NV memory 120 in response to the at least one host command. For example, the memory controller 110 may be intermittently writing the data into the NV memory 120. For another example, the memory controller 110 may be regularly writing the data into the NV memory 120. In addition, operations of the second GC stage can be performed in a situation where the memory device 100 is not writing any data in response to any host command from the host device 50. For brevity, similar descriptions for these embodiments are not repeated in detail here.

Figure 3:
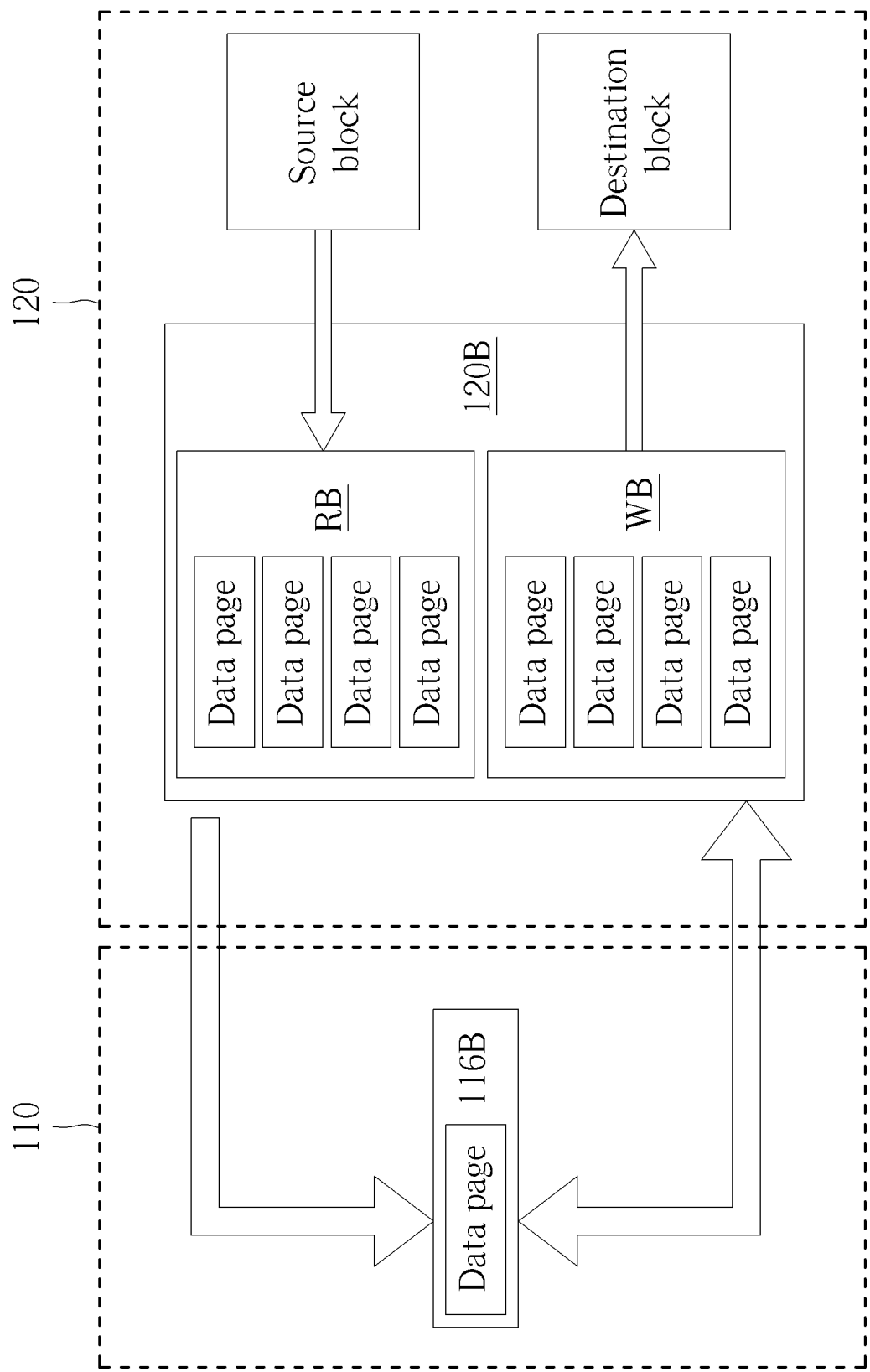
FIG. 3 illustrates an access control scheme of the method shown in FIG. 2A and FIG. 2B according to an embodiment of the present invention.

FIG. 3 illustrates an access control scheme of the method shown in FIG. 2A and FIG. 2B according to an embodiment of the present invention. In a situation where the destination block is a QLC block, each of the read buffer RB and the write buffer WB may be designed to have a buffer size corresponding to four data pages. For example, the data buffer 116B may be designed to have a much smaller buffer size such as the buffer size corresponding to one data page.

The memory controller 110 (e.g. the microprocessor 112) can perform access control of the memory device 100 with aid of the multi-stage GC management, to prevent the data error problem. For brevity, similar descriptions for this embodiment are not repeated in detail here.

Figure 4:
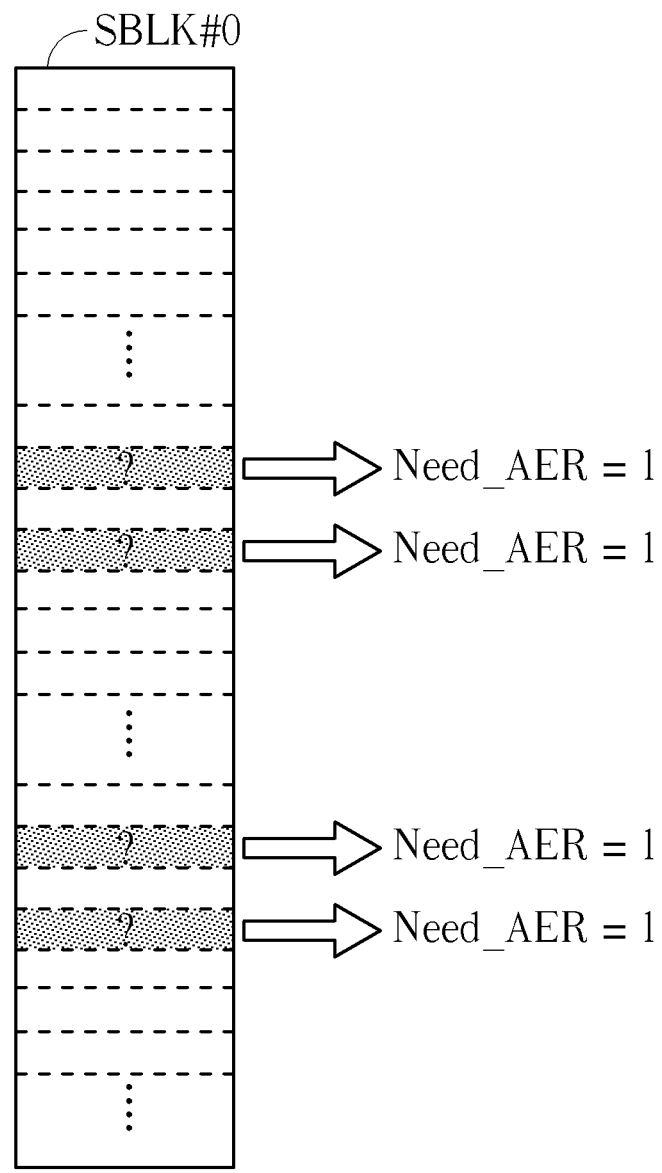
FIG. 4 illustrates a multi-stage GC control scheme of the method shown in FIG. 2A and FIG. 2B according to an embodiment of the present invention.

FIG. 4 illustrates a multi-stage GC control scheme of the method shown in FIG. 2A and FIG. 2B according to an embodiment of the present invention. The memory controller 110 (e.g. the microprocessor 112) can maintain the aforementioned NAR table such as the source block NAR table STBL to manage at least one source block (SBLK) such as one or more source blocks. For example, the source block mentioned in Step S11 may represent any source block among the at least one source block, and the at least one source block may comprise a first source block such as SBLK #0, but the invention is not limited thereto. In a situation where the at least one source block comprises a plurality of source blocks (e.g. the first source block such as SBLK #0, and a second source block such as SBLK #1), the source block mentioned in Step S11 may represent any source block among the plurality of source blocks.

As shown in FIG. 4, during the first GC stage, Step S11 may be executed many times to try reading the valid data from the first source block such as SBLK #0, and Step S13B may be executed multiple times (e.g. four times) for some physical pages (e.g. four physical pages) having unsuccessfully read valid data (labeled "?" for better comprehension). As a result, the memory controller 110 (e.g. the microprocessor 112) can mark these physical pages as needing advanced read with the need advanced read flag Need_AER, and more particularly, set the need advanced read flag Need_AER to be a first predetermined value such as one (labeled "Need_AER=1" for brevity), for indicating that these physical pages are arranged to be further processed with the advance read operation in the next GC stage such as the second GC stage, where the first predetermined value is different from a default value such as zero. For brevity, similar descriptions for this embodiment are not repeated in detail here.

According to some embodiments, the first predetermined value can be replaced with any value among multiple predetermined values that are different from the default value. For brevity, similar descriptions for these embodiments are not repeated in detail here.

Figure 5:
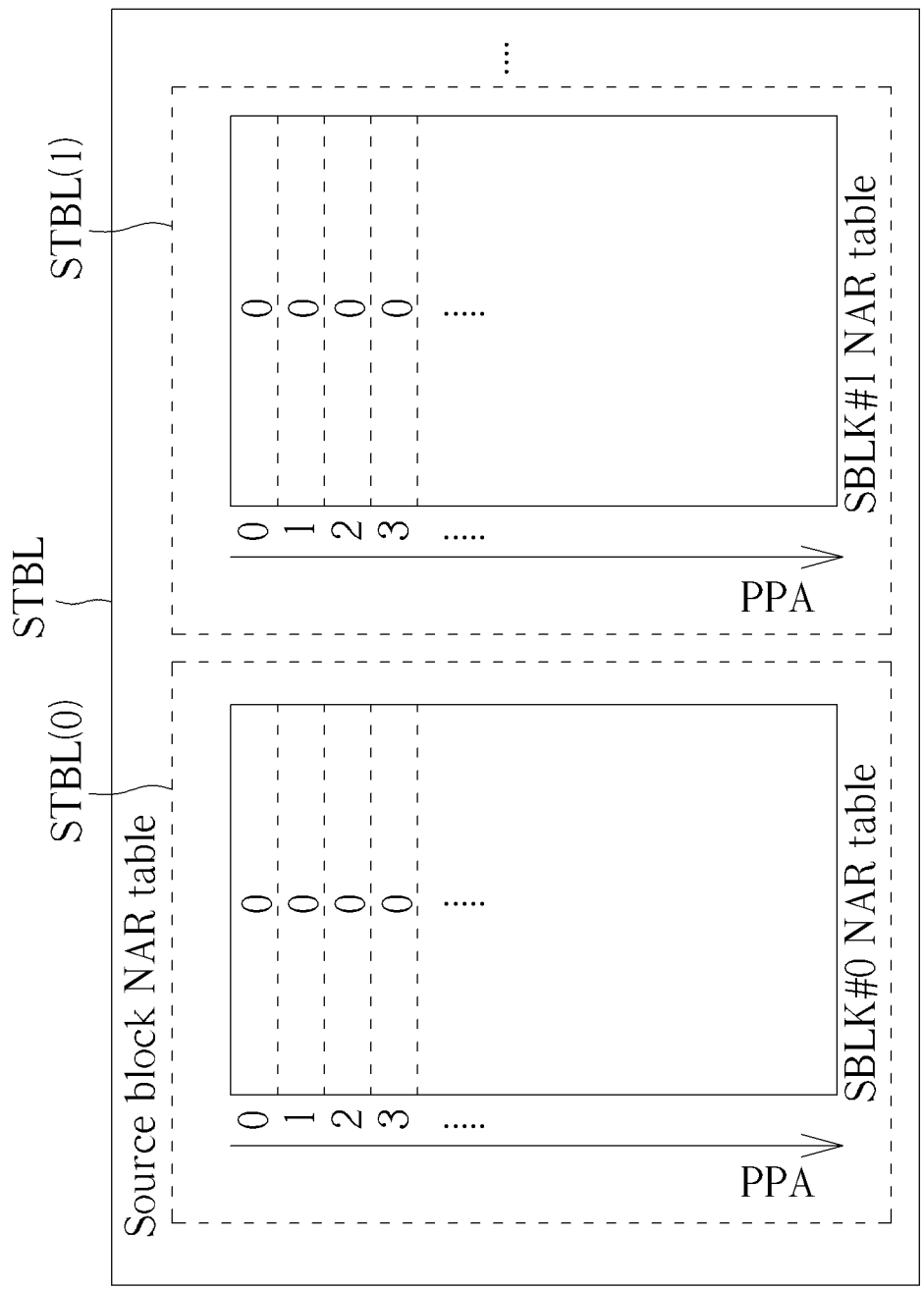
FIG. 5 illustrates a source block needing-advanced-read (NAR) control scheme of the method shown in FIG. 2A and FIG. 2B according to an embodiment of the present invention.

FIG. 5 illustrates a source block NAR control scheme of the method shown in FIG. 2A and FIG. 2B according to an embodiment of the present invention. In a situation where the at least one source block comprises the plurality of source blocks such as SBLK #0, SBLK #1, etc., the source block NAR table STBL may comprise multiple sub-tables respectively corresponding to the source blocks (SBLKs) #0, #1, etc., such as the SBLK #0 NAR table STBL(0), the SBLK #1 NAR table STBL(1), etc. respectively corresponding to SBLKs #0, #1, etc.

As shown in FIG. 5, the index of any source block NAR table corresponding to a certain SBLK among the SBLK #0 NAR table STBL(0), the SBLK #1 NAR table STBL(1), etc. can be a physical page address (PPA) for indicating a physical page in this SBLK. As a physical address may comprise a physical block address (PBA) for indicating this SBLK (e.g. the SBLK comprising this physical page) and the PPA for indicating this physical page, the memory controller 110 (e.g. the microprocessor 112) can determine the at least one previously accessed data page (e.g. at least one physical page that has been skipped and marked as needing advanced read in Step S13B during the first GC stage) according to the source block NAR table STBL (e.g. a sub-table thereof, such as the any source block NAR table corresponding to this SBLK), to obtain the need advanced read flag Need_AER corresponding to this physical address.

Before starting using the any source block NAR table corresponding to this SBLK, the memory controller 110 (e.g. the microprocessor 112) can clear all NAR information entries of multiple NAR information entries of the any source block NAR table, and more particularly, set each NAR information entry of the multiple NAR information entries as the default value such as zero (e.g. Need_AER=0). During the first GC stage, when Step S13B is entered in response to reading the valid data of a certain physical page in this SBLK being unsuccessful, the memory controller 110 (e.g. the microprocessor 112) can change a certain NAR information entry corresponding to this physical page (e.g. the NAR information entry corresponding to the PPA of this physical page) among the multiple NAR information entries to be the first predetermined value such as one (e.g. Need_AER=1). During the second GC stage, when Step S19A is entered in response to reading the valid data of this physical page in this SBLK being successful, the memory controller 110 (e.g. the microprocessor 112) can change this NAR information entry back to the default value such as zero (e.g. Need_AER=0). For brevity, similar descriptions for this embodiment are not repeated in detail here.

According to some embodiments, in a situation where the at least one source block comprises only the first source block such as SBLK #0, the memory controller 110 (e.g. the microprocessor 112) can merely use the SBLK #0 NAR table STBL(0), and does not need to use the SBLK #1 NAR table STBL(1), etc., but the invention is not limited thereto. For example, the memory controller 110 (e.g. the microprocessor 112) can merely establish the SBLK #0 NAR table STBL(0), and does not need to establish the SBLK #1 NAR table STBL(1), etc. For brevity, similar descriptions for these embodiments are not repeated in detail here.

Figure 6:
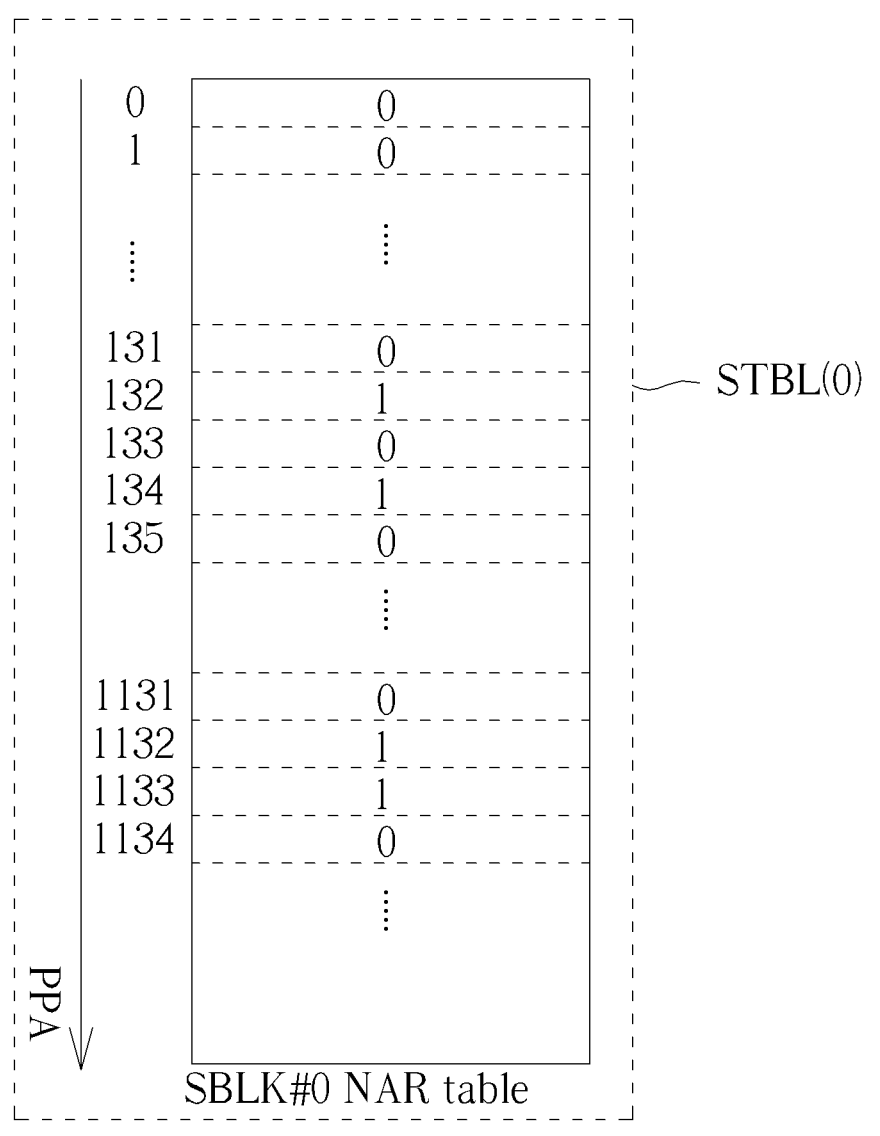

FIG. 6 illustrates some NAR information entries recorded based on the source block NAR control scheme shown in FIG. 5 according to an embodiment of the present invention. The SBLK #0 NAR table STBL(0) can be taken as an example of the any source block NAR table mentioned above. During the first GC stage, when Step S13B is entered in response to reading the valid data of any physical page of the physical pages at the PPAs {132, 134, 1132, 1133} within the source block such as SBLK #0 being unsuccessful, the memory controller 110 (e.g. the microprocessor 112) can change the NAR information entry corresponding to this physical page (e.g. the NAR information entry corresponding to one of the PPAs {132, 134, 1132, 1133}) to be the first predetermined value such as one (e.g. Need_AER=1). For brevity, similar descriptions for this embodiment are not repeated in detail here.

Figure 7:
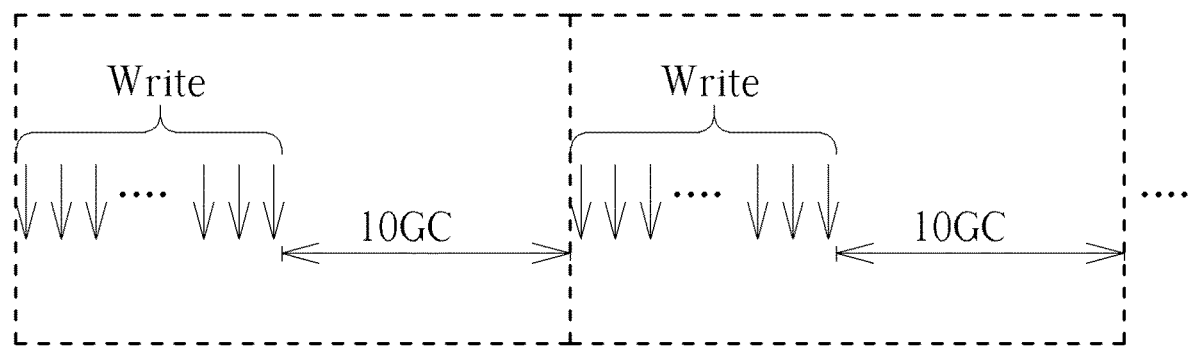
FIG. 7 illustrates a write plus multi-stage GC control scheme of the method shown in FIG. 2A and FIG. 2B according to an embodiment of the present invention.

FIG. 7 illustrates a write plus multi-stage GC control scheme of the method shown in FIG. 2A and FIG. 2B according to an embodiment of the present invention. As mentioned above, the operations of the first GC stage can be performed in the background while the memory controller 110 is writing the data from the host device 50 into the NV memory 120 in response to the at least one host command. For example, the host device 50 may have a sustain write behavior (labeled "Write" for brevity, where the downward arrows may represent write requests and/or write operations) to allow the memory device 100 to perform some other operations. The memory controller 110 (e.g. the microprocessor 112) can perform access control of the memory device 100 with aid of the multi-stage GC management, to prevent the data error problem and further prevent any delay of the at least one host-triggered operation. For example, by performing at most a predetermined number of GC operations such as ten GC operations (labeled "10GC" for brevity) in an idle phase after a writing phase within any of multiple sustain write periods (e.g. the periods indicated by the rectangles depicted with dashed lines), the memory controller 110 (e.g. the microprocessor 112) can prevent any delay of the host-triggered write operations. For brevity, similar descriptions for this embodiment are not repeated in detail here.

Figure 8:
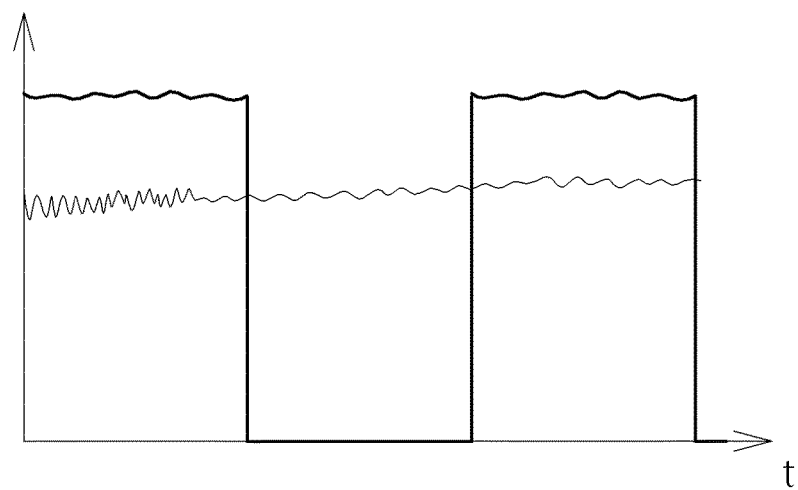
FIG. 8 illustrates improvement regarding write input/output per second (IOPS) according to an embodiment of the present invention.

FIG. 8 illustrates improvement regarding write input/output per second (IOPS) according to an embodiment of the present invention. The memory controller 110 (e.g. the microprocessor 112) can perform at most the predetermined number of GC operations such as ten GC operations in the idle phase within any of the multiple sustain write periods as shown in FIG. 7, without delaying any host-triggered write operations. In comparison with a single stage GC control scheme that does not rely on the multi-stage GC management, the memory controller 110 (e.g. the microprocessor 112) operating according to the method (e.g. the multi-stage GC control scheme) can maintain a greater average value of the write IOPS with respect to time (labeled "t" for brevity) and prevent the write IOPS from dropping to zero. For example, the curve depicted with bold lines may correspond to the single stage GC control scheme and indicate that the write IOPS sometimes drops to zero, and the curve depicted with thin lines may correspond to the multi-stage GC control scheme and indicate that the write IOPS has a greater average value than that of the single stage GC control scheme and will not drop to zero. For brevity, similar descriptions for this embodiment are not repeated in detail here.

According to some embodiments, a test preparation procedure of the method may comprise some additional steps for being executed before Step S10 shown in FIG. 2A, and may be arranged to test whether the memory device 100 (e.g. the memory controller 110 therein) is correctly implemented to operate according to the method, where the test preparation procedure can be inserted before Step S10 without changing the original steps such as Steps S10, S11, etc. shown in FIG. 2A and FIG. 2B and the associated partial working flows (e.g. loops) comprising the original steps. In the test preparation procedure, the memory controller 110 (e.g. the microprocessor 112) can perform the following operations:

(1) in a time period before the beginning time point of the first GC stage, in response to a set of host commands (e.g. host write commands) among the plurality of host commands, the memory controller 110 (e.g. the microprocessor 112) can send data carried by the set of host commands into the NV memory 120, for being programmed into the plurality of data blocks, wherein the data amount of the data is large enough to trigger the GC procedure;

(2) in the time period before the beginning time point of the first GC stage, in response to multiple first host commands (e.g. host read commands) among the plurality of host commands, the memory controller 110 (e.g. the microprocessor 112) can send multiple first read commands such as a large amount of simple read commands to the NV memory 120 in order to try reading first data from at least one page of a first block (e.g. the source block such as SBLK #0) among the plurality of blocks multiple times, respectively, where for each time of the multiple times except the last time of the multiple times, reading the first data from the at least one page of the first block is successful, and for the last time of the multiple times, reading the first data from the at least one page of the first block is unsuccessful; and (3) in the time period before the beginning time point of the first GC stage, in response to reading the first data from the at least one page of the first block being unsuccessful, the memory controller 110 (e.g. the microprocessor 112) can send at least one second read command such as one or more advanced read commands to the NV memory 120 in order to retry reading the first data from the at least one page of the first block;

where the first data in the at least one page of the first block may have become damaged, for example, due to a certain effect (e.g. the read disturbance) of the reading operations corresponding to the multiple first read commands, but the invention is not limited thereto.

After the test preparation procedure, based on the original steps such as Steps S10, S11, etc. shown in FIG. 2A and FIG. 2B, the memory controller 110 (e.g. the microprocessor 112) can further perform the following operations:

(1) during the first GC stage, when Step S11 is entered at the first time point, the memory controller 110 (e.g. the microprocessor 112) can send the first simple read command to the NV memory 120 in order to try reading the first valid data from the source block (e.g. the source block such as SBLK #0), and more particularly, successfully read the first valid data from at least one first page of the source block (e.g. the source block such as SBLK #0);

(2) during the first GC stage, when Steps S12 and S13A are subsequently entered afterward, the memory controller 110 can send the first valid data into the internal buffer 120B of the NV memory 120, for being programed into the destination block, where the first block is used as the source block (e.g. the source block such as SBLK #0), and the at least one first page of the source block is different from the at least one page of the first block;

(3) during the first GC stage, when Step S11 is entered at the second time point, the memory controller 110 can send the second simple read command to the NV memory 120 in order to try reading the second valid data (e.g. the first data that may have become damaged) from the source block (e.g. the source block such as SBLK #0);

(4) during the first GC stage, when Steps S12 and S13B are subsequently entered afterward, in response to reading the second valid data (e.g. the first data that may have become damaged) from the source block being unsuccessful, the memory controller 110 can prevent retrying reading the second valid data (e.g. the first data mentioned above) from the source block, for waiting for further processing during the second GC stage after the first GC stage; and (5) in the time period between the end time point of the first GC stage and the beginning time point of the second GC stage, when Step S16 is re-entered for waiting for the chance to start the second GC stage, in response to at least one other host command among the plurality of host commands, the memory controller 110 (e.g. the microprocessor 112) can read the first valid data from the destination block and tries reading the second valid data (e.g. the first data that may have become damaged) from the source block;

but the invention is not limited thereto. In addition, regarding the multi-stage GC management, retrying reading the second valid data (e.g. the first data that may have become damaged) from the source block can be postponed until the second GC stage. As a result, the operation of reading the first valid data and the operation of trying reading the second valid data (e.g. the first data mentioned above) are performed on different blocks such as the destination block and the source block, respectively, which may indicate that the memory device 100 (e.g. the memory controller 110 therein) has been correctly implemented to operate according to the method. For brevity, similar descriptions for these embodiments are not repeated in detail here.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method for performing access control of a memory device with aid of multi-stage garbage collection (GC) management, the method being applied to a controller of the memory device, the memory device comprising the controller and a non-volatile (NV) memory, the NV memory comprising at least one NV memory element, the at least one NV memory element comprising a plurality of blocks, the method comprising:

during a first GC stage, sending a first simple read command to the NV memory in order to try reading first valid data from a first source block among the plurality of blocks;

during the first GC stage, in response to reading the first valid data from the first source block being successful, sending the first valid data into an internal buffer of the NV memory, for being programed into a first destination block among the plurality of blocks;

during the first GC stage, sending a second simple read command to the NV memory in order to try reading second valid data from the first source block;

during the first GC stage, in response to reading the second valid data from the first source block being unsuccessful, preventing retrying reading the second valid data from the first source block;

in a time period between an end time point of the first GC stage and a beginning time point of a second GC stage after the first GC stage, completing at least one host-triggered operation, wherein the controller performs the at least one host-triggered operation in response to at least one host command among a plurality of host commands from a host device; and during the second GC stage, retrying reading the second valid data from the first source block.

2. The method of claim 1, wherein multiple simple read commands comprise the first simple read command and the second simple read command; and preventing retrying reading the second valid data from the first source block further comprises:

preventing sending any advanced read command to the NV memory, wherein the any advanced read command and any simple read command among the multiple simple read commands belong to different types of read commands, respectively.

3. The method of claim 2, wherein the any advanced read command represents any read command among multiple types of read commands causing more read processing time of the NV memory than that of the any simple read command.

4. The method of claim 1, wherein multiple simple read commands comprise the first simple read command and the second simple read command; and retrying reading the second valid data from the first source block further comprises:

sending at least one advanced read command to the NV memory in order to try reading the second valid data from the first source block, wherein the at least one advanced read command and any simple read command among the multiple simple read commands belong to different types of read commands, respectively.

5. The method of claim 4, wherein the at least one advanced read command comprises at least one read command among multiple types of read commands causing more read processing time of the NV memory than that of the any simple read command.

6. The method of claim 1, further comprising:

during the first GC stage, in response to reading the second valid data from the first source block being unsuccessful, sending a third simple read command to the NV memory in order to try reading third valid data from the first source block; and during the first GC stage, in response to reading the third valid data from the first source block being successful, sending the third valid data into the internal buffer of the NV memory, for being programed into the first destination block.

7. The method of claim 1, wherein operations of the first GC stage are performed in background while the controller is writing data from the host device into the NV memory in response to the at least one host command.

8. The method of claim 7, wherein operations of the second GC stage are performed in a situation where the memory device is not writing any data in response to any host command from the host device.

9. A controller of a memory device, the memory device comprising the controller and a non-volatile (NV) memory, the NV memory comprising at least one NV memory element, the at least one NV memory element comprising a plurality of blocks, the controller comprising:

a processing circuit, configured to control the controller according to a plurality of host commands from a host device, to allow the host device to access the NV memory through the controller;

wherein:

during a first GC stage, the controller sends a first simple read command to the NV memory in order to try reading first valid data from a first source block among the plurality of blocks;

during the first GC stage, in response to reading the first valid data from the first source block being successful, the controller sends the first valid data into an internal buffer of the NV memory, for being programed into a first destination block among the plurality of blocks;

during the first GC stage, the controller sends a second simple read command to the NV memory in order to try reading second valid data from the first source block;

during the first GC stage, in response to reading the second valid data from the first source block being unsuccessful, the controller prevents retrying reading the second valid data from the first source block;

in a time period between an end time point of the first GC stage and a beginning time point of a second GC stage after the first GC stage, the controller completes at least one host-triggered operation, wherein the controller performs the at least one host-triggered operation in response to at least one host command among the plurality of host commands; and during the second GC stage, the controller retries reading the second valid data from the first source block.

10. The memory device comprising the controller of claim 9, wherein the memory device comprises:
the NV memory, configured to store information; and
the controller, coupled to the NV memory, configured to control operations of the memory device.

11. A method for performing access control of a memory device with aid of multi-stage garbage collection (GC) management, the method being applied to a controller of the memory device, the memory device comprising the controller and a non-volatile (NV) memory, the NV memory comprising at least one NV memory element, the at least one NV memory element comprising a plurality of blocks, the method comprising:
in a time period before a beginning time point of a first GC stage, in response to multiple first host commands among a plurality of host commands from a host device, sending multiple first read commands to the NV memory in order to try reading first data from at least one page of a first block among the plurality of blocks multiple times, respectively, wherein for each time of the multiple times except a last time of the multiple times, reading the first data from the at least one page of the first block is successful, and for the last time of the multiple times, reading the first data from the at least one page of the first block is unsuccessful;
in the time period before the beginning time point of the first GC stage, in response to reading the first data from the at least one page of the first block being unsuccessful, sending at least one second read command to the NV memory in order to retry reading the first data from the at least one page of the first block;
during the first GC stage, reading first valid data from at least one first page of a first source block and sending the first valid data into an internal buffer of the NV memory, for being programed into a first destination block among the plurality of blocks, wherein the first block is used as the first source block, and the at least one first page of the first source block is different from the at least one page of the first block;
during the first GC stage, trying reading the first data from the first source block, and in response to reading the first data from the first source block being unsuccessful, preventing retrying reading the first data from the first source block, for waiting for further processing during a second GC stage after the first GC stage; and
in a time period between an end time point of the first GC stage and a beginning time point of the second GC stage, in response to at least one other host command among the plurality of host commands, reading the first valid data from the destination block and trying reading the first data from the first source block.

12. The method of claim 11, wherein the at least one second read command and any first read command among the multiple first read commands belong to different types of read commands, respectively.

13. The method of claim 12, wherein the multiple first read commands represent multiple simple read commands, and the at least one second read command represents at least one advanced read command.

14. The method of claim 13, wherein the at least one advanced read command represents at least one read command among multiple types of read commands causing more read processing time of the NV memory than that of any simple read command among the multiple simple read commands.

15. The method of claim 11, wherein retrying reading the first data from the first source block is postponed until the second GC stage.

16. The method of claim 11, wherein reading the first valid data from the at least one first page of the first source block further comprises:
sending at least one third read command to the NV memory in order to try reading the first valid data from the at least one first page of the first source block, wherein reading the first valid data from the at least one first page of the first source block is successful.

17. The method of claim 16, wherein trying reading the first data from the first source block further comprises:
sending a fourth read command to the NV memory in order to try reading the first data from the first source block.

18. The method of claim 16, wherein the at least one second read command and any first read command among the multiple first read commands belong to different types of read commands, respectively; and the at least one third read command and the any first read command belong to a same type of read commands.

19. A controller of a memory device, the memory device comprising the controller and a non-volatile (NV) memory, the NV memory comprising at least one NV memory element, the at least one NV memory element comprising a plurality of blocks, the controller comprising:
a processing circuit, configured to control the controller according to a plurality of host commands from a host device, to allow the host device to access the NV memory through the controller;
wherein:
in a time period before a beginning time point of a first GC stage, in response to multiple first host commands among the plurality of host commands, the controller sends multiple first read commands to the NV memory in order to try reading first data from at least one page of a first block among the plurality of blocks multiple times, respectively, wherein for each time of the multiple times except a last time of the multiple times, reading the first data from the at least one page of the first block is successful, and for the last time of the multiple times, reading the first data from the at least one page of the first block is unsuccessful;
in the time period before the beginning time point of the first GC stage, in response to reading the first data from the at least one page of the first block being unsuccessful, the controller sends at least one second read command to the NV memory in order to retry reading the first data from the at least one page of the first block;
during the first GC stage, the controller reads first valid data from at least one first page of a first source block and sends the first valid data into an internal buffer of the NV memory, for being programed into a first destination block among the plurality of blocks, wherein the first block is used as the first source block, and the at least one first page of the first source block is different from the at least one page of the first block;
during the first GC stage, the controller tries reading the first data from the first source block, and in response to reading the first data from the first source block being unsuccessful, the controller prevents retrying reading the first data from the first source block, for waiting for further processing during a second GC stage after the first GC stage; and in a time period between an end time point of the first GC stage and a beginning time point of the second GC stage, in response to at least one other host command among the plurality of host commands, the controller reads the first valid data from the destination block and tries reading the first data from the first source block.

20. The memory device comprising the controller of claim 19, the memory device comprising:

the NV memory, configured to store information; and the controller, coupled to the NV memory, configured to control operations of the memory device.

* * * * *